Aug. 7, 1951    L. W. PARKER    2,563,740
FILAMENT POWER SUPPLY SYSTEM FOR RADIO RECEIVERS
Filed Dec. 5, 1947    2 Sheets-Sheet 1
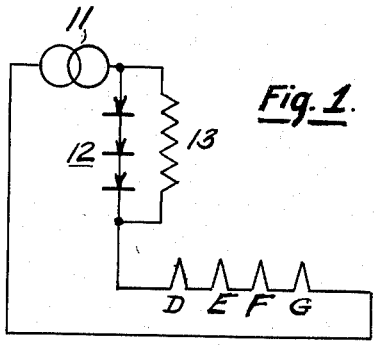
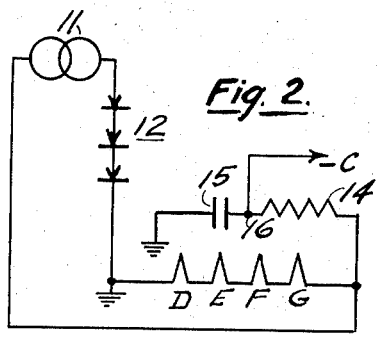
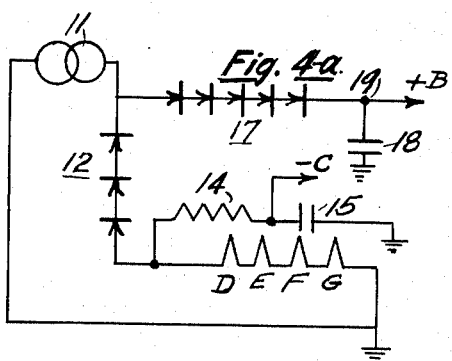
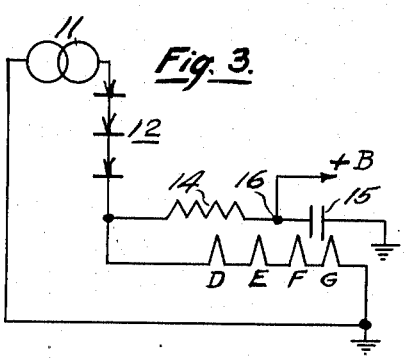
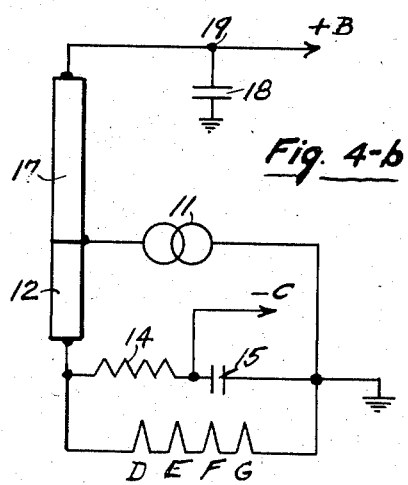
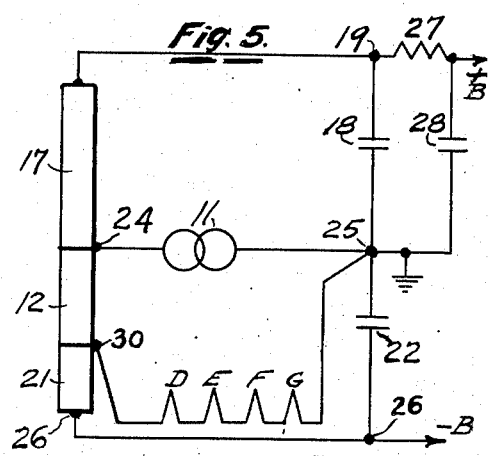
INVENTOR.
Louis W. Parker
BY Julius E. Foster
ATTY Aug. 7, 1951 L. W. PARKER 2,563,740
FILAMENT POWER SUPPLY SYSTEM FOR RADIO RECEIVERS
Filed Dec. 5, 1947 2 Sheets-Sheet 2

Fig. 6-a.

INVENTOR.
Louis W. Parker
BY
ATTY

Patented Aug. 7, 1951

2,563,740

UNITED STATES PATENT OFFICE 2,563,740

FILAMENT POWER SUPPLY SYSTEM FOR RADIO RECEIVERS

Louis W. Parker, Little Neck, N. Y.

Application December 5, 1947, Serial No. 789,961

9 Claims. (Cl. 250—27)

This invention relates to radio receivers, of the transformerless type, to be operated from an alternating current supply circuit.

One object of this invention is to provide a radio receiver in which contact-type rectifiers are employed together with suitable condensers to provide appropriate voltages for cathode heaters, grid excitation and plate operation, from an alternating voltage supply circuit.

In receivers of the so-called A. C.-D. C. type, an electronic rectifier with heated filaments is used to provide a source of uni-directional voltage for plate operation of the tubes. Also since the voltage required for the cathode heaters of the tubes is less than the voltage of the usual commercial power or lighting circuit, a dropping resistor is used to absorb the undesired voltage drop. Both of those devices, that is, the electronic rectifier and the dropping resistor, generate considerable heat within the receiver compartment. This presents a problem of heat dissipation and ventilation which usually requires greater spacing between components, and, consequently more volumetric spaces and larger cabinets.

Another object of this invention, therefore, is to provide such a voltage-reducing system in which a minimum amount of heat is generated, so that, consequently, the spacing of components no longer introduces problems of ventilation, and the elements may be compactly arranged.

Another object of this invention is to provide such a voltage-producing system in which a high-voltage source in excess of the supply voltage is established for plate operation of the receiver tubes, while at the same time providing an available voltage for grid bias and cathode heater excitation.

Another disadvantage that is encountered in receivers of the A. C.-D. C. type that employ a dropping resistor, is that when a change occurs in the load in the circuit fed through the dropping resistor, the voltage drop across the resistor varies and affects the voltage available for the load.

A further object of this invention, therefore, is to provide a voltage-reducing system that maintains a fairly steady potential even with varying load.

Another disadvantage found in receivers where a dropping resistor is used, is the longer time required to heat the cathode heaters to operating temperatures.

The method and circuit described herein for energizing the cathode heaters provides the advantage of quicker starting.

The output of a rectifier is of the pulsating type, including A. C. and D. C. components, as is well known; and this output is ordinarily filtered to eliminate the D. C. component and obtain steady D. C. voltage. Such filters, however, result in loss of energy and generate heat. A feature of this invention is the utilization of the unfiltered rectifier output, including both components, to energize the cathode heaters, an arrangement that obtains the required voltage drop without heating or loss of energy.

In the application of this invention to a radio receiver a stack of selenium contact-type rectifiers is utilized as a whole with suitable condensers to constitute a voltage doubler to establish a voltage of substantially double the voltage of the supply circuit that is used, to provide a relatively high operating voltage for the plates of the receiver tubes; and a part only of the stack of rectifiers is used for energizing the cathode heaters and for energizing an R.-C. filter circuit from which a suitable voltage may be derived to serve as a grid bias voltage for the tubes.

A radio receiver system in which the invention is utilized, and the manner in which the invention functions are illustrated in the accompanying drawings, in which:

Figure 1 is a simplified schematic diagram of a rectifier system for energizing the cathode heaters of a group of electronic tubes;

Figure 2 is a similar diagram of a system for energizing the cathode heaters, with an R.-C. filter circuit to provide a source of grid bias voltage of negative polarity for the tubes;

Figure 3 is a diagram similar to Fig. 2 arranged to provide a voltage of positive polarity for an inexpensive receiver where low plate voltage would be adequate;

Figure 6:
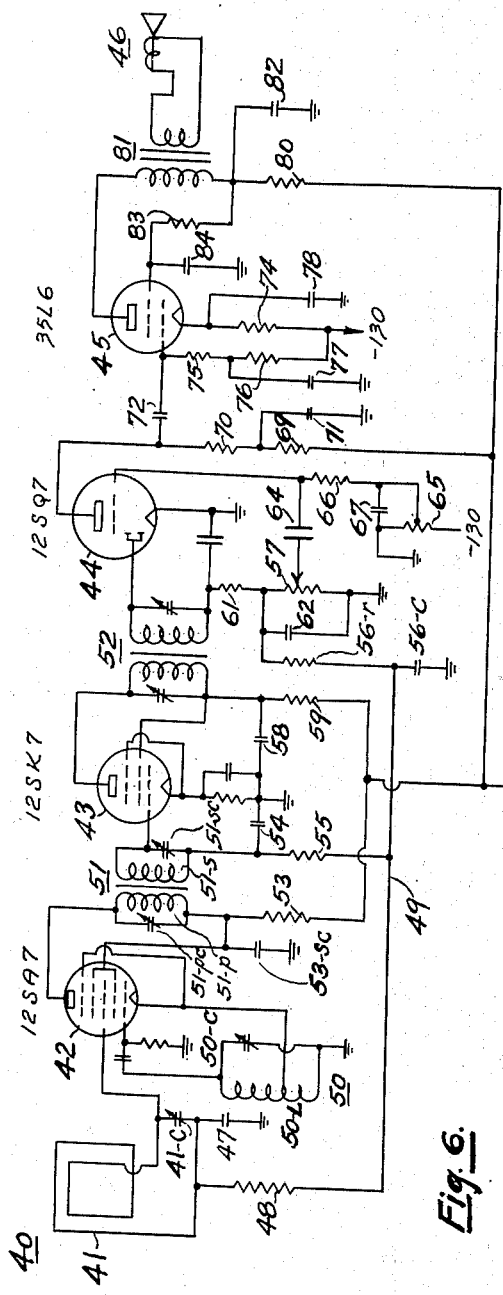

Figure 4—a is a diagram similar to Fig. 3 with a rectifier and condenser circuit added to provide a source of plate voltage;

Figure 4—b is a re-arrangement of the circuit of Fig. 4—a;

Figure 5 is a further development of the circuit of Fig. 4—b to provide a voltage-doubling circuit for the plate voltage; and Figure 6 is a diagram of a simple receiver embodying the invention; and Fig. 6—a shows the rectifier supply.

As shown in Fig. 1 energy from an alternating current supply circuit 11 is supplied to a plurality of cathode heating elements D, E, F, and G, in series, through a stack of series-connected rectifiers 12. The heating elements may be for cathodes of individual cascaded electron tubes, or a pair of the heaters may be in one tube to heat two cathodes. For the purpose of this application, the arrow heads on the rectifiers 12, represent the direction of conventional current.

The rectifiers 12 are preferably of the selenium contact type which are presently commercially available for use up to 250 milliamperes. They are particularly suited to the present invention since they have a high reverse resistance and can withstand a reverse voltage up to about 75 volts per rectifier unit. For this application, the maximum limit is restricted to 50 volts. Thus for the usual commercially available alternating current supply circuit of 110 to 120 volts, three rectifier units in series will suffice to control a conductive utilization circuit such as that including the cathode heaters D, E, F, and G. A by-pass resistor 13 shown bridging the rectifiers may be used under certain conditions, to permit some current to pass to the heaters when the polarity of the circuit would be such as to render the rectifiers non-conductive.

When the resistor 13 is not used, the rectifiers will conduct the current waves of only one polarity to the heaters. The current on reverse polarity is small. Thus the voltage waves of only one polarity are effective to cause current flow in the heater circuit.

Assuming for example, a sine wave voltage from supply circuit 11, having a value $e = E_m \sin \omega t$ applied to the heater circuit with a total resistance R, the current $i$ through the heaters would be $$i = \frac{E_m}{R} \sin \omega t = I_m \sin \omega t$$

where $I_m$ is the maximum or peak value of the current wave.

Instantaneous power P is the heater circuit would be $$P = ei = \frac{E_m^2}{R} \sin^2 \omega t = RI_m^2 \sin^2 \omega t$$

That power integrated over one-half cycle, or one wave, and then averaged over the period of one wave or half cycle gives average power per half cycle as $$\frac{P_{av}}{\pi} = \frac{RI_m^2}{2}$$

This value of power available during one wave, when divided over the entire cycle of both waves, gives the cycle average $$\frac{P_{av}}{2\pi} = \tfrac{1}{4} R I_m^2$$

This quantity, in terms of effective current, is equal to $$\frac{P_{av}}{2\pi} = I_{eff}^2 R = \tfrac{1}{4} R I_m^2$$

Therefore, $$I_{eff}^2 = \tfrac{1}{4} I_m^2$$

and $$I_{eff} = \frac{I_m}{2}$$

that is, one half of peak value. Similarly the effective voltage is half of peak voltage.

Assuming, for example, that the voltage of the supply circuit 11, is 120 volts, that will be the R. M. S. value, and the peak value will be about 170 volts for each wave of the supply voltage. Since only the waves of one polarity will be transmitted to the heaters, the effective voltage to the heaters over an entire cycle will be one-half the maximum or peak voltage of one wave. Similarly the effective current will be one-half the maximum or peak of the sine current wave.

The effective voltage drop across the cathode heaters is therefore one-half of 170 volts or 85 volts, theoretically.

However, due to losses in the rectifiers and because of the rectifier characteristics, the actual effective voltage applied across the cathode heaters, as measured, is about 73 volts.

This effective voltage is particularly suitable for the application described herein, where three of the cathode heaters of standard electron tubes for receiver service require 12.6 volts per cathode heater, and the fourth tube employs a cathode heater requiring 35 volts. The total voltage required for the heater circuit is thus $3 \times 12.6 + 35$ volts, or 72.8 volts. The effective voltage available from the single polarity waves thus provides substantially the voltage required for the circuit of the cathode heaters. Where some slight additional voltage may be desired, the by-pass resistor 13 may be employed to pass some additional current to the heaters.

It is evident from the mathematical analysis given above that the present system contemplates the use of both A. C. and D. C. components of the rectifier output to energize the heaters.

The advantage of this method of heater excitation over the dropping resistor method may be noted briefly here. When starting operation of a receiver having a conventional dropping resistor circuit, a proportionately smaller part of the circuit voltage is available across the heaters at starting than after the heaters are brought to operating temperature, due to the smaller resistance of the heaters at starting, when they are cold. After they heat up and increase their resistances, a proportionately greater part of the heating circuit voltage is available for the heaters.

In the system disclosed herein, however, the full heating voltage is immediately available to the cathode heaters with consequent faster heating and faster starting of the receiver.

In Fig. 2 is illustrated a modification of the circuit of Fig. 1, to provide a source of grid bias potential. Fig. 2 includes the supply circuit 11, the rectifiers 12, the cathode heaters D, E, F, and G, and an R.-C. filter circuit including a resistor 14 and a condenser 15 in series across the cathode heaters. The grounded points indicate the points of common potential, or chassis connection. With the rectifiers connected as shown with the forward or positive direction from ground potential through the cathode heaters, the potential difference established across the condenser 15 will be such as to make the juncture point 16 between the condenser and the resistor negative relative to ground potential. Since the cathodes of the usual receiver tubes are placed at ground potential, this arrangement of Fig. 2 provides a negative potential for grid biasing.

By re-arranging the location of the ground point relative to the heaters and the rectifiers, as in Fig. 3, the ground is made the low potential point. With the resistor-condenser circuit also re-arranged as in Fig. 3, the juncture voltage take-off point 16 is positive relative to ground, and thus provides a source of positive potential, which may be used in inexpensive receivers in lieu of the usual plate supply.

Figure 4—a shows a further development of the circuit whereby a plate voltage also may be obtained from the supply circuit without a transformer. The circuit of Fig. 4—a includes the supply circuit 11, the rectifiers 12 for the cathode heaters, the R.-C. filter circuit including the resistor 14 and the condenser 15 for grid-bias voltage, and a circuit to establish the plate voltage and including a plurality of rectifiers 17 and a condenser 18 connected between the conductors of the supply circuit 11. As illustrated in Fig. 4—a, the condenser 18 and one main supply circuit conductor are grounded, thus providing the direct connection between them. It will be observed that the rectifiers 12 and 17 are in the same direction, a feature which is utilized to advantage in this invention.

In order to illustrate some advantage of the system of this invention, Fig. 4—a is re-arranged as in Fig. 4—b. The rectifiers 12 and 17 are all in the same direction physically, and may therefore be combined conveniently in one stack during manufacture, for use in this system. Such compactness may be utilized to advantage in a system where this invention can be used, since very little heat is generated, and therefore no problem of heat dissipation is presented.

In Figs. 4—a and 4—b, the waves of only one polarity are employed to establish the plate voltage across condenser 18. A stack of five rectifier units is used. This arrangement provides the peak voltage of about 170 volts from the supply circuit 11.

In order to establish a greater voltage for the plate circuit, the waves of both polarities are utilized, as in Fig. 5. A similar stack of five rectifier units is then used for the waves of each polarity. Each stack of rectifiers charges a separate condenser, and the voltages are added to provide a double voltage for the plate circuit of the receiver.

As shown in Fig. 5, the rectifiers now constitute two equal groups of five units each, the upper group 17 containing five rectifier units, and the two lower groups 12 and 21 together containing five units. A condenser 22 similar to condenser 18 is connected between the bottom terminal of the lower stack 12—21 and the common or ground terminal, one conductor of the main supply circuit 11 being also grounded.

The two rectifier stacks and the two condensers 18 and 22 thus arranged as a bridge, constitute a voltage-doubler. The two conductors of the supply circuit 11 are connected between two opposite corners 24 and 25, and two output or plate potentials corresponding to B+ and B— potentials relative to ground are obtained at corners 19 and 26. For the B+ output at corner 19, a filter is provided including a resistor 27 and a condenser 28. The voltage between B+ and B— under normal load is therefore double the value of the effective voltage of the supply circuit 11 and amounts to about 240 volts.

As shown in Fig. 5, the cathode heaters are connected in the same manner as in Fig. 4—b, so the effective voltage across them remains at the value previously referred to. The condenser 22 is prevented from discharging through the cathode heaters, by the rectifiers 21. In connection with this arrangement, grid bias is obtained from the cathode resistor, as will be shown in the diagram of Fig. 6.

The advantages of this system will be apparent from the simplicity and symmetry of the basic circuit of Fig. 5. The functions of the rectifier units are such as to permit their initial assembly, all physically in the same direction, as an article of manufacture in a single stack, thus contributing to simplicity and economy of manufacture and of space requirement, and to greater reliability in operation after assembly.

Only the two end terminals of the stack, the mid-terminal 24, and the off-center terminal 30 of the rectifier stack need be provided for external connections to a system, to be energized from the rectifiers as described herein. The symmetry of the bridge constituted by the rectifiers and the two condensers 18 and 22, permits simple disposition and connection of these units as an integrated component of manufacture, ready for quick and easy assembly in a radio receiver.

In Fig. 6, a diagram is shown of a simple radio receiver 40 embodying the present invention as a power source of operating voltages. The receiver 40 comprises, generally, as its main components, an antenna loop 41, a converter tube 42 (such as a 12SA7), an I. F. amplifier tube 43 (such as a 12SK7), a detector amplifier tube 44 (such as a 12SQ7), an audio frequency amplifier power tube 45 (such as a 35L6), and a dynamic speaker 46.

The antenna loop 41 is provided with a series tuning condenser 41—c for tuning in a signal of desired frequency which is supplied to the control grid of the converter 42. A grounding condenser 47 connects one terminal of the antenna loop 41 to the common ground of the receiver. AVC biassing potential for the grid is applied to the lower terminal of the antenna loop through a resistor 48 connected to an AVC grid-bias bus 49, fed from the diode of the detector amplifier 44.

An oscillator 50, consisting of an inductance 50—L and an adjustable tuning condenser 50—C, is connected between the cathode and the first grid of the converter tube 42, through a suitable grid leak condenser and resistor, to change the selected incoming frequency to the I. F. frequency of the receiver, as predetermined by the double tuned transformers 51 and 52 in the output circuits of the converter tube 42 and of the I. F. amplifier respectively. The primary and the secondary windings 51—P and 51—S of transformer 51 are provided with adjustable condensers 51—PC and 51—SC to tune the windings to desired I. F. frequency. The primary winding 51—p is connected to the plate of tube 42 and in series with an isolating resistor 53 to the B+ (+ 130 volts) terminal of the rectifier bridge, for the plate voltage. The isolating resistor 53 is also utilized as a voltage-dropping resistor for the screen grid of the converter tube 42, and a grounding condenser 53—sc for the screen grid of converter tube 42 also provides an alternating-circuit by-pass for the isolating resistor 53 and the power supply.

The secondary 51—S of transformer 51 is tuned by its condenser 51—SC and is connected to be effective between the grid and the cathode of the I. F. amplifier 43. The upper terminal of 51—S goes to the grid, and the lower terminal goes to ground through a condenser 54.

The lower terminal of the secondary winding 51—S is also connected through an isolating resistor 55 to the AVC bus 49. The AVC bus is energized in conventional manner from the diode section of the detector amplifier 44. As shown, the bus 49 is connected to an audio frequency filter 56, consisting of a resistor 56—r and condenser 56—c, energized from a load resistor 57 that is fed from the diode section of detector amplifier 44 through an R. F. filter consisting of a resistor 61 and condenser 62. The AVC bias is thus applied to the grid of I. F. amplifier 43.

The output of the I. F. amplifier 43 is fed to the primary of coupling transformer 52, and the A.-C. current is completed to the cathode through a condenser 58 to ground. Plate voltage for the I. F. amplifier is supplied from the B+ (+ 130 v.) terminal of the voltage doubler of the rectifier through an isolating resistor 59 and the primary winding of the transformer 52.

The secondary winding of the coupling transformer 52 is connected at its upper terminal to the diode plate, and at its lower terminal to the filter resistor 61 that lead to the diode load resistor 57 which supplies the D.-C. component for the AVC bias. The diode load resistor 57 is also provided with a potentiometer adjustable tap connection to provide a signal connection to the grid of the triode, or amplifier section, of the detector amplifier 44, which serves as the first audio amplifier or voltage amplifier, and is resistance-coupled to the second audio or power amplifier 45. The signal circuit from the load resistor 57 to the grid of amplifier 44 includes a coupling condenser 64. Suitable negative bias for that grid of the amplifier 44 is made available from a voltage-dividing unit shown simply as a potentiometer 65 energized from the negative terminal of the rectifier source to ground. An adjustable tap indicates that any selected negative bias within the potentiometer range may be obtained. Such bias voltage could normally be within the range of the potential difference across the load circuit of the cathode heaters, as in Fig. 4—a or in Fig. 4—b, and the grid bias could be derived as in one of those figures. The grid bias voltage is applied to the grid through a grid leak resistor 66. A by-pass condenser 67 keeps the signal R. F. out of the rectifier voltage supply.

The plate of the first amplifier 44 receives its voltage from the B+ (+ 130 v.) terminal of the rectifier supply, through an isolating resistor 69 and a load resistor 70. A condenser 71 co-operates with resistor 69 to serve as a decoupling filter for the plate circuit.

The first audio amplifier 44 is resistance-coupled to the second or power amplifier 45 through the load resistor 70 and a coupling condenser 72, the latter connecting to the grid of amplifier 45.

The relatively high voltage available from the voltage doubler circuit of the rectifier power supply, as in Fig. 5, may be utilized to advantage here, since it permits the use of a high power tube requiring a high plate voltage, such as the 35L6. The rectifier power supply as provided herein also makes available an adequate grid bias voltage without diminishing the desired high plate voltage. That is one of the important features of this invention. The availability of such bias voltage permits the use of a low-mu tube to reduce distortion and supply high power.

The voltage for the cathode of the power amplifier 45 is shown supplied from the B— (— 130 v.) terminal of the rectifier power supply to the cathode through a cathode bias resistor 74, thus putting the full voltage of the voltage doubler across the power amplifier 45. The grid of amplifier 45 is also provided with bias voltage from that rectifier power supply through a grid leak resistor 75 and the resistor 76 of a decoupling filter including resistor 76 and a grounded condenser 77. The isolating resistor 76 provides a conductive connection from the cathode resistor 74 to the grid leak resistor 75. The usual by-pass condenser 78 is provided for the cathode resistor 74.

The plate voltage for the power amplifier is supplied to the plate from the B+ (+ 130 v.) of the rectifier power supply through a decoupling filter resistor 80 and the primary winding of an output transformer 81. A grounded condenser 82 co-operates with resistor 80 to isolate the plate circuit. A dropping resistor 83 supplies voltage to the screen grid, which is provided with the usual grounding condenser 84.

The output of the power amplifier 45 is fed through the output transformer to the speaker 46.

In Fig. 6—a is shown the rectifier power supply for the plate and cathode heater voltages for the circuit of Fig. 6, and corresponding in part to the arrangement in Fig. 5, with corresponding elements similarly numbered.

A plug 90 connects to an alternating current supply circuit, and upon closure of switch 91, energy is supplied to the cathode heaters D, E, F, G through the rectifiers 12. The voltage doubler arrangement of rectifiers and condensers is otherwise similar to that shown in Fig. 5.

As previously explained, one of the major advantages of this invention is the connection of the cathode heaters to the power supply source without the medium of an energy-absorbing heat-producing impedance that would, first, retard the heating of the cathode heaters, and, second, vary the voltage supplied to the heaters as the receiver load varied. With the present construction, the cathode heaters are more rapidly heated to operating temperature and the voltage supplied to them in substantially constant and independent of load variations in the receiver.

The invention is not limited specifically to the circuit shown, since modification may be made therein without departing from the spirit and scope of the invention as set forth in the appended claims.

I claim:

1. A radio receiver having a power supply adapted to energize with initial rapidity a plurality of tubes having cathode heaters, from a commercial alternating current supply circuit without using a transformer, comprising a voltage-dropping circuit arranged for connection to the supply circuit and including a contact-type rectifier unit having an output containing both A. C. and D. C. components, and a rectifier output circuit connected to the heaters in series and free from A. C.-eliminating elements, arranged to supply both components to the heaters.

2. A system as claimed in claim 1 in which the rectifier output circuit is free from substantial heat-generating resistive components.

3. A system as claimed in claim 1, including a resistive bridge across the rectifier stack, arranged to supply a small amount of increased voltage to the heaters.

4. A system as claimed in claim 1, including a second output circuit connected to the rectifier unit, and including a filter unit, arranged to supply only the D. C. component to the receiver.

5. A system as claimed in claim 4 in which the second output circuit is connected in parallel to the series of heaters.

6. A system as claimed in claim 4 in which the filter unit includes a resistor and a condenser in combination having a time constant sufficiently in excess of the time interval of the supply circuit voltage waves to maintain a voltage across the condenser substantially at the peak of the voltage applied to the filter unit and suitable for use as a steady D. C. supply for the receiver.

7. A radio receiver having a power supply adapted to energize with initial rapidity a plurality of tubes having cathode heaters, from a commercial alternating current supply circuit without using a transformer, comprising a rectifier unit having a plurality of contact rectifiers in series provided with connections for the supply circuit across only a part of the series, arranged to form a voltage multiplier, said unit having an output containing both A. C. and D. C. components, a D. C. output circuit connected across the rectifier unit and including a filter unit, arranged to supply only the D. C. component to the receiver, and a heater circuit connected across a portion of the rectifier series and to the heaters in series, and free from A. C.-eliminating elements, arranged to supply both components to the heaters.

8. A system as claimed in claim 7, including a second D. C. output circuit connected across a portion of the rectifier series and including a filter unit, arranged to supply a second lower D. C. voltage to the receiver.

9. A system as claimed in claim 8 in which the filter unit includes a condenser and a resistive element, and the resistive element includes a part of the rectifier series.

LOUIS W. PARKER.

REFERENCES CITED

The following references are of record in the file of this patent:

UNITED STATES PATENTS

| Number | Name | Date |
|---|---|---|
| 1,729,753 | Stryker et al. | Oct. 1, 1929 |
| 1,745,841 | Bradbury | Feb. 4, 1930 |
| 1,902,235 | Heintz | Mar. 21, 1933 |
| 2,222,196 | Vilkomerson | Nov. 19, 1940 |
| 2,265,958 | Vilkomerson | Dec. 9, 1941 |

FOREIGN PATENTS

| Number | Country | Date |
|---|---|---|
| 265,183 | Great Britain | May 19, 1927 |
| 369,038 | Great Britain | Mar. 17, 1932 |
| 385,972 | Great Britain | Dec. 16, 1932 |